M. LAMMERS.
MILKING APPARATUS.
APPLICATION FILED MAY 20, 1919.
1,338,182.
Patented Apr. 27, 1920.
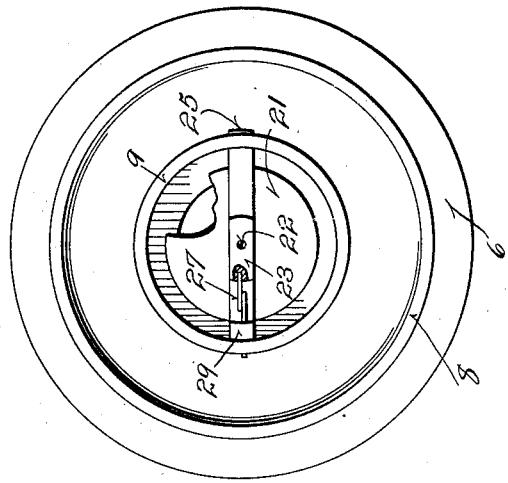
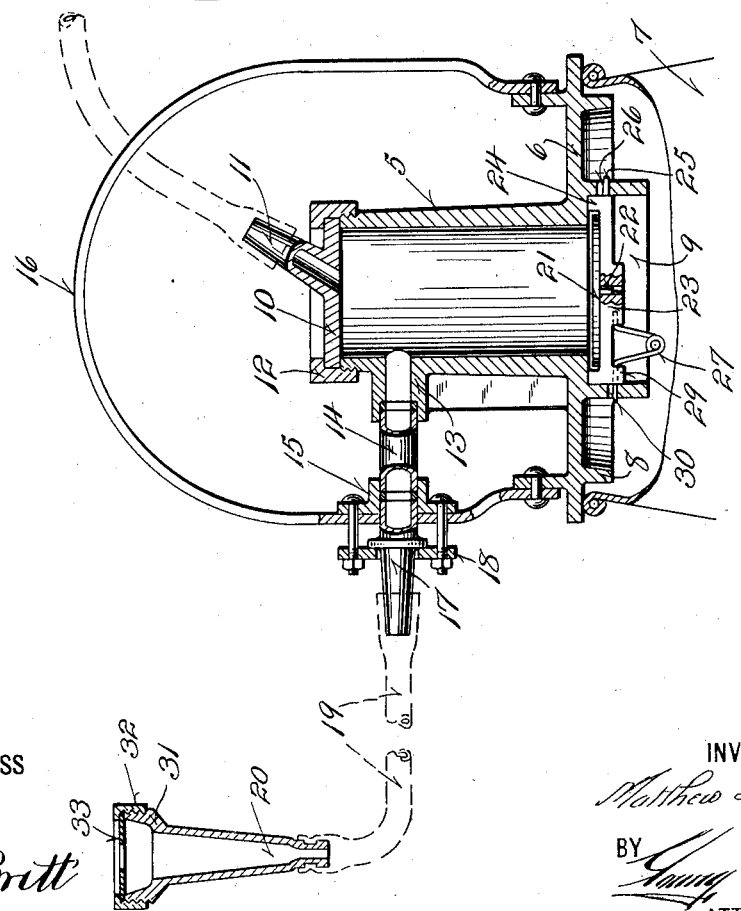
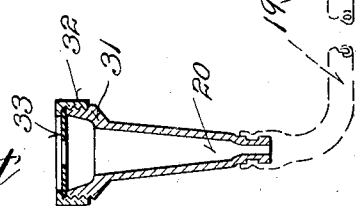
WITNESS
J. P. Britt
INVENTOR
Matthew Lammers
BY
Young & Young
ATTORNEYS

UNITED STATES PATENT OFFICE.

MATTHEW LAMMERS, OF SHEBOYGAN FALLS, WISCONSIN.

MILKING APPARATUS.

1,338,182.     Specification of Letters Patent.     Patented Apr. 27, 1920.

Application filed May 20, 1919. Serial No. 298,501.

*To all whom it may concern:*

Be it known that I, MATTHEW LAMMERS, a citizen of the United States, and resident of Sheboygan Falls, in the county of Sheboygan and State of Wisconsin, have invented certain new and useful Improvements in Milking Apparatus; and I do hereby declare that the following is a full, clear, and exact description thereof.

My invention relates to new and useful improvements in milking apparatus, more particularly of that type including a milker head adapted for disposition on a pail or other receptacle and having a vacuum chamber provided with teat cup and vacuum connections and adapted to discharge directly into the main receptacle upon relief of vacuum therein, the present apparatus constituting an improvement of the structure shown in my co-pending application for patent filed June 11, 1918, Serial No. 239,387.

It is an object of my present invention to improve the valve structure of the milker head whereby to provide for a most responsive and efficient action thereof, and to permit ready disassembly of the valve structure incidental to the frequent cleaning operations necessary in the continued use of the apparatus.

A further and important object of my invention resides in the provision of an improved teat cup structure adapted to comfortably yet firmly grip the teat of the cow in an air-tight manner, a more detailed object in this connection being to provide for relative slight movement of the teat and cup in the applied position of the cup.

With the above and other objects and advantages in view, which will be apparent as the description proceeds, my invention resides in the novel features of construction, combination and arrangement of parts as hereinafter more particularly described and defined by the appended claims.

In the accompanying drawings:

Figure 1 is a vertical sectional view through a milker head and teat cup embodying my invention.

Fig. 2 is a bottom plan view of the milker head, and

Fig. 3 is an end view of the teat cup.

Referring now more particularly to the accompanying drawings, as in my said co-pending application, there is provided a milker head comprising a vacuum chamber formed of a cylindrical wall 5 open at its bottom and provided with an outwardly extending annular flange 6 adapted to seat upon the milk pail 7, said flange being provided adjacent its edge with a depending rim 8 and having a depending annular apron 9 concentric with and slightly larger than the interior of the vacuum chamber. The upper portion of the chamber is closed by a rotatably adjustable plate 10 carrying an upstanding nipple 11 for attachment of a vacuum tube, said plate being retained in place by a clamping ring 12 threaded on the upper end of the chamber wall. The chamber wall is provided at its upper portion with a laterally extending nipple 13 receiving one end of a sight tube 14 which has its other end engaged in a sleeve 15 mounted in one side of the bail handle 16 of the milker head, a nipple 17 being also engaged in said sleeve and being secured by the draw-plate 18, said nipple 17 being connected by a tubing 19 with the reduced end of the teat cup 20.

All of this structure described is shown in my said co-pending application for patent. The depending apron 9 of the base flange 6 of the milker head is utilized to mount the check valve plate 21 thereof, and in the present structure this plate is provided with a central depending pintle 22 loosely engaged in the central recess of a cross-bar 23 disposed transversely within the confines of the apron and having upstanding end lugs 24 abutting the bottom face of the base, whereby when the bar is mounted in place, a slight movement of the valve plate 21 is permitted between said bar and the bottom face of the milker head, whereby upon the occurrence of vacuum in the milker head, the valve will instantly lift to closing position, and will drop and seat upon the bar 23 upon relief of vacuum to permit discharge of milk from the chamber. The bar is detachably mounted in place by engagement with opposite portions of the depending apron 9, thus, a pintle 25 is provided on one end of the bar which engages in a relatively large opening 26 in the apron, and a wire spring member 27 is provided, which is bent to form leg portions resiliently urged apart, one of these leg portions being engaged with the intermediate portion of the bar, while the other leg portion has its free end bent to extend through a depending lug 29 on the end of the bar remote from the pintle 25, said bent portion of the spring leg being engageable in an opening 30 of the adjacent portion of the apron 9.

Thus, by retracting the latch formed by the bent portion of the spring 27, the holding bar may be swung downwardly and detached from the milker head, thus releasing the valve plate 21 whereby all of the parts may be readily and thoroughly cleaned, it being noted that both the assembly and disassembly of the present valve structure may be most readily effected.

The major portion of the teat cup 20 is of the usual elongated conical shape. The mouth portion of the wall of the cup is, however, outwardly offset at 31 and a cap ring 32 is threaded on this offset wall portion having an inturned flange 32 adapted to clamp the usual sealing diaphragm 33 against the end of the cup. Thus, when the teat of the cow is inserted in the cup, an annular chamber will be provided by the offsetting or enlargement of the mouth portion of the wall of the cup, thus permitting the use of a relatively wide diaphragm member, and providing for movement of the diaphragm gasket member axially of the cup in accordance with corresponding movement of the cow's teat with respect to the cup, thus providing a loose and comfortable yet positive and leakproof securement of the cup on the teat.

I have shown and described an exceedingly simple and efficient milking apparatus which may be readily assembled and disassembled. The operation of the apparatus is entirely conventional; the air is exhausted from the chamber of the milker head, causing milk to flow from the teat of the cow into the cup 21 and thence into the chamber, the vacuum being then relieved whereupon the milk drawn into the chamber is discharged past the valve plate into the pail or other main receptacle, the limited movement of the valve plate by reason of the bar 23, providing for a most rapid and sensitive operation of the plate.

What is claimed is:

1. In a milking apparatus, a milker head including a chamber open at one end, a bar detachably mounted transversely of the open end of the chamber in spaced relation thereto, a valve plate movable between the bar and the end of the chamber, said bar being provided with a recess, and a pintle on the central portion of the valve plate engageable in said recess to prevent lateral movement of the valve plate.

2. In a milking apparatus, a milker head including a chamber open at one end, a bar detachably mounted transversely of the open end of the chamber, lugs on the ends of the bar engaging the end of the chamber to hold said bar in spaced relation thereto, and a valve plate movable between the bar and the end of the chamber.

3. In a milking apparatus, a milker head including a vacuum chamber open at one end, apertured projecting portions at opposite portions of the open end of the chamber, a retaining bar, a pintle on one end of the bar engageable in the aperture of one of said projecting portions, a latch member at the other end of the bar engageable in the aperture of the other projecting portions, and a valve member movable between said retaining bar and the end of the chamber.

In testimony that I claim the foregoing I have hereunto set my hand at Sheboygan Falls, in the county of Sheboygan, and State of Wisconsin.

MATH. LAMMERS.